Nov. 14, 1939.     J. C. CARLTON ET AL     2,180,289
DRILLING AND HONING MACHINERY
Filed July 25, 1938     5 Sheets-Sheet 3

Fig. 4

INVENTORS:
Jack C. Carlton,
Albert E. Haugulberg

Patented Nov. 14, 1939

2,180,289

UNITED STATES PATENT OFFICE 2,180,289

DRILLING AND HONING MACHINERY

Jack C. Carlton and Albert C. Spangenberg, Cincinnati, Ohio, assignors to The Carlton Machine Tool Company, Cincinnati, Ohio, a corporation of Ohio Application July 25, 1938, Serial No. 221,133

25 Claims. (Cl. 29—26)

It is the object of the present invention to provide novel mechanism adapted to be incorporated in a usual radial or other drilling machine whereby the machine may be used to perform honing operations; further, to provide novel means for changing the relation between the rate of rotary movement of the tool and the rate of axial movement thereof, to impart a relatively fast rotary movement and a relatively slow axial movement to a tool, as in drilling operations, and a relatively slow rotary movement and a relatively fast axial movement to a tool as in honing operations; further, to provide means whereby the tool will be fed axially by power in consonance with tool rotation while drilling, and be reciprocated axially by power irrespective of tool rotation while honing; and, further, to provide simple and efficient controlling means to enable the machine to quickly perform the different kinds of work mentioned.

It is a further object of the invention to provide in a drilling machine having the usual spindle rotating and feeding means, independent power means to axially reciprocate or translate the spindle for honing operations; further, to provide means whereby to vary the speed of axial movement imparted to the spindle by such independent power means; further, to provide means to vary the length of stroke and range of axial movement imparted to the spindle by said independent spindle reciprocating means; and, further, to provide novel means for neutralizing the usual spindle feeding means when the independent spindle translating means are employed.

The present invention consists in novel means for accomplishing these objects; further, in the provision of novel means to impart a reciprocating axial movement to the spindle of a drilling machine that will enable the machine to be used for honing operations; further, in means to vary the rate of axial movement so imparted to the spindle; and, further, in providing novel means to vary the length of stroke and the range of such reciprocatory axial movements.

The invention consists further, in the provision of novel power driving means independent of the spindle rotating power means to axially reciprocate the spindle by power irrespective of the rotary movement thereof; further, in novel means to neutralize the manual and power spindle translating means that are employed in drilling operations, when the machine is used for honing; and, further, in means to prevent such neutralization inadvertently during drilling operations.

The invention consists, further, in novel mechanism whereby to associate means for drilling and means for honing in a single machine employing elements common to both operations; further, in providing means whereby to selectively entrain such respective elements; further, in providing a plurality of trains of mechanism, each of which axially reciprocates or translates the tool spindle and means to selectively entrain the same with the tool spindle.

The invention consists, further, in providing novel head mechanism including manually operable levers arranged to be placed in a plurality of positions respectively for power feeding, for manual feeding, and for release from feeding of the spindle; further, in providing in association with the latter, additional power means to axially reciprocate or translate the spindle; further, in providing control means for reversals of said translations; and, further, in providing manual operating means for said control means whereby the limits of axial reciprocations of said spindle by said additional power means are manually controlled.

The invention will be further readily understood from the following description and claims, and from the drawings, in which latter:

Fig. 11 is a diagrammatic representation of the hydraulic devices and the connections therefor, partly broken away.

Fig. 12 is a cross-sectional view of the pilot valve, taken on the line 12—12 of Fig. 10, and partly broken away; and, Fig. 13 is an axial section of the reversing valve, taken on the line 13—13 of Fig. 11, and partly broken away, and being shown diagrammatic in part.

The present invention is applicable to any usual form of drilling machine and is shown in connection with a usual radial drill, of the type shown and described in Letters Patent of the United States No. 1,638,654, for Radial drill, granted August 9, 1927, on the application of Jack C. Carlton.

Figure 1:
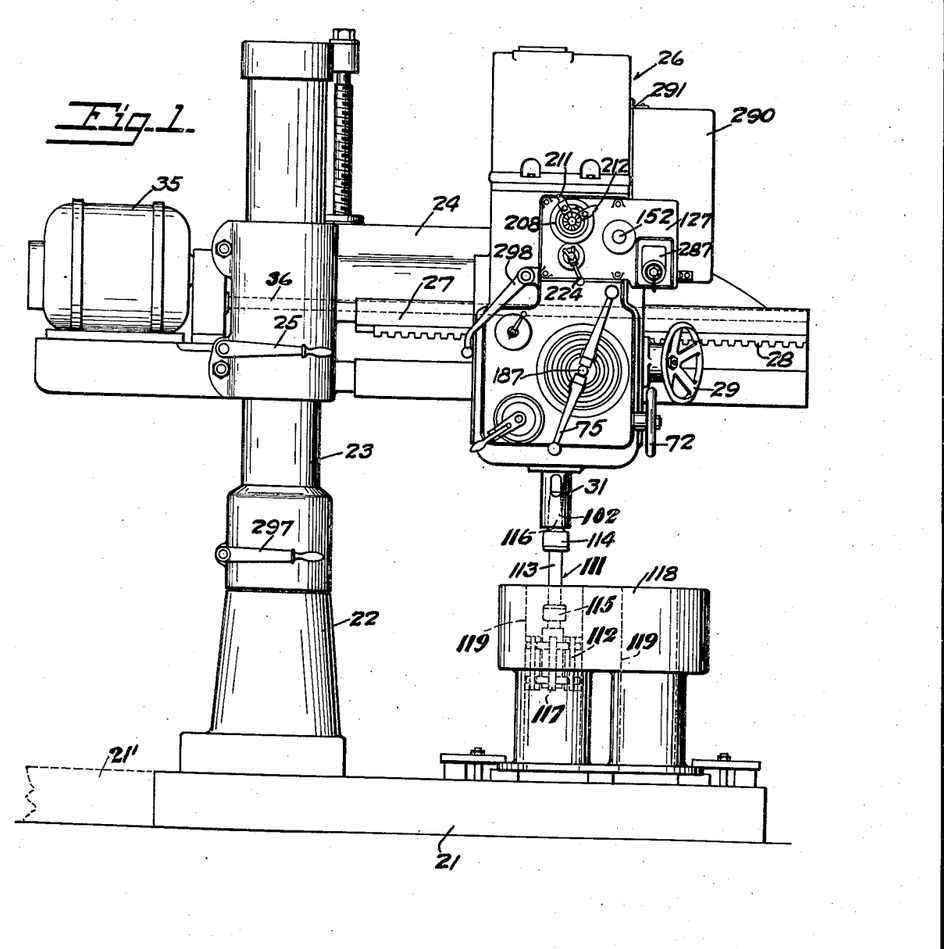
Fig. 1 is a front elevational view of an exemplifying drilling machine having the present invention applied thereto, and showing an extension of the base in dotted lines, and partly broken away.
Figure 4:
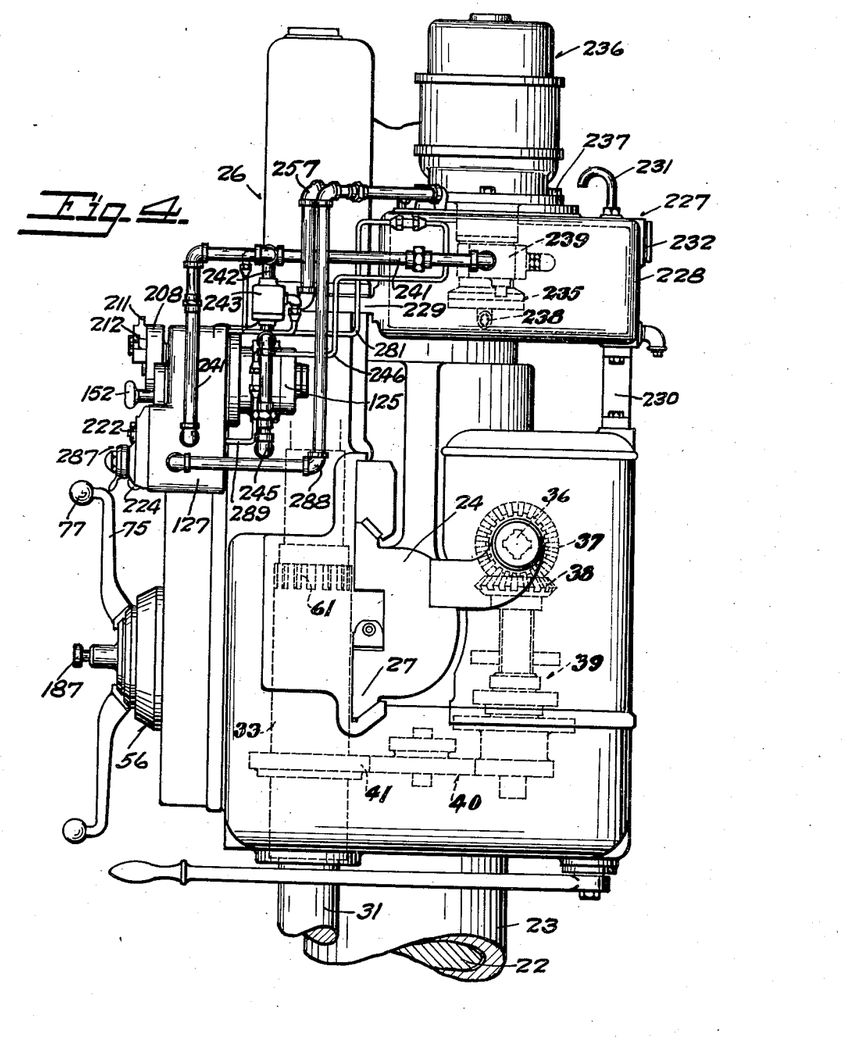
Fig. 4 is an end view of the device, partly broken away.

The drilling machine herein exemplified comprises a usual base 21, from which a vertical post or standard 22 extends upwardly (Figs. 1 and 4). Rotatably mounted about the standard 22 is a column 23, arranged to be clamped thereto in adjusted positions. An arm 24 is suitably mounted on the column and is adjustable vertically thereon and clamped in adjusted positions thereto by a usual clamp operated by the clamp handle 25. A tool slide 26 is arranged to be moved laterally on the arm on guideways 27, as by means of the usual rack 28 and cooperating rack pinion actuated by the hand wheel 29. It is arranged to be clamped in suitable positions to the arm.

Figures 5, 6, 7, 8, 9:
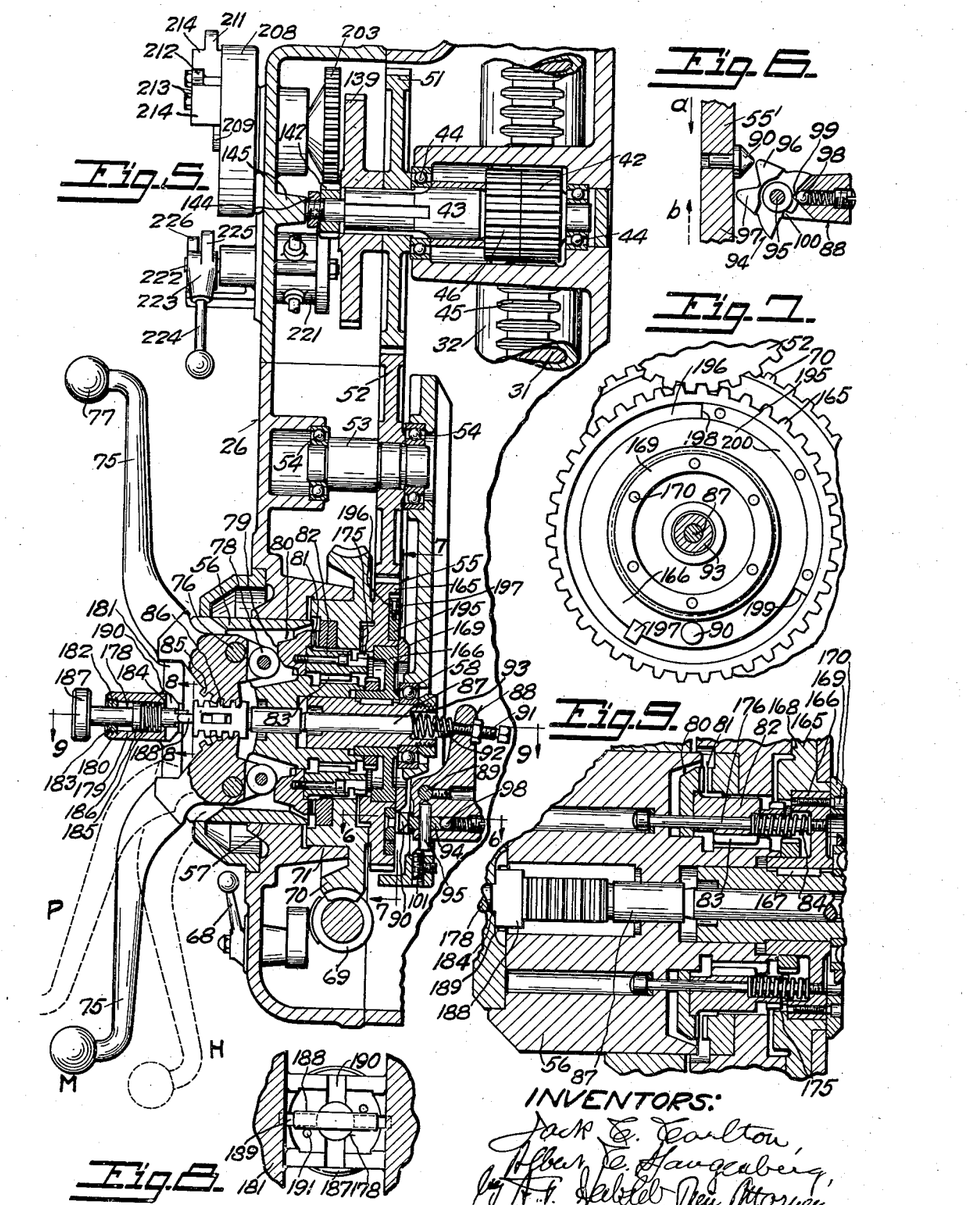
Fig. 5 is a vertical sectional view, taken on the line 5—5 of Fig. 2, showing a portion of the spindle translating mechanism in the slide, and partly broken away.
Fig. 6 is a detail view of tripping mechanism for the feed in a drilling machine, which is modified by the present invention to provide greater length of translatory movement of the spindle, the view being taken on a line corresponding to the line 6—6 of Fig. 5, and partly broken away.
Fig. 7 is a cross-section of a detail of the tripping mechanism of the present invention, taken in the plane of the line 7—7 of Fig. 5, and partly broken away.
Fig. 8 is a cross-sectional view of a detail of the same, taken in the plane of the line 8—8 of Fig. 5, and partly broken away.
Fig. 9 is an axial sectional view of a detail of the spindle translating mechanism, taken in the plane of the line 9—9 of Fig. 5, and partly broken away.

A usual rotatable tool spindle 31 and a usual rack-sleeve 32 thereabout are translatable up and down in the slide (Figs. 4 and 5). The tool spindle is rotatably mounted in the rack-sleeve and is rotatable with a usual rotatable spindle sleeve 33, journaled in the slide, the spindle being splined to the latter sleeve in usual manner.

In the present exemplification there is an electric motor 35 mounted on the arm for rotating and axially translating the tool spindle in drilling operations. A usual cross-shaft 36 is rotated by this motor in usual manner. It extends lengthwise of the arm and is rotatably supported in usual bearings in the arm and has slidable spline connection with a usual clutch element located between a usual pair of bevel gears 37 rotatable about the cross-shaft. The clutch element may be shifted to clutch either of the bevel gears of the pair of the cross-shaft and thereby impart selective reverse rotations to a bevel gear 38 located between and in mash with the pair of bevel gears 37. A train of speed change gearing 39 is driven by the bevel gear 38 selectively in opposite directions and transmits power rotation to the spindle by means of transmission gearing 40 in mesh with a gear 41 fixed to the spindle sleeve.

Means are provided for translating the spindle in reverse directions (Figs. 5 and 10), exemplified as comprising a feed pinion 42 fixed on a shaft 43 journaled in bearings 44 in the slide and meshing with a rack 45 on the rack-sleeve 33. A pinion 46 rotates loosely about the feed pinion shaft and meshes with the rack 45 and with a rack 47 on a counter-balance bar 48 slidable axially in a bearing 49 in the slide to counter-balance the spindle.

Figures 2, 3:
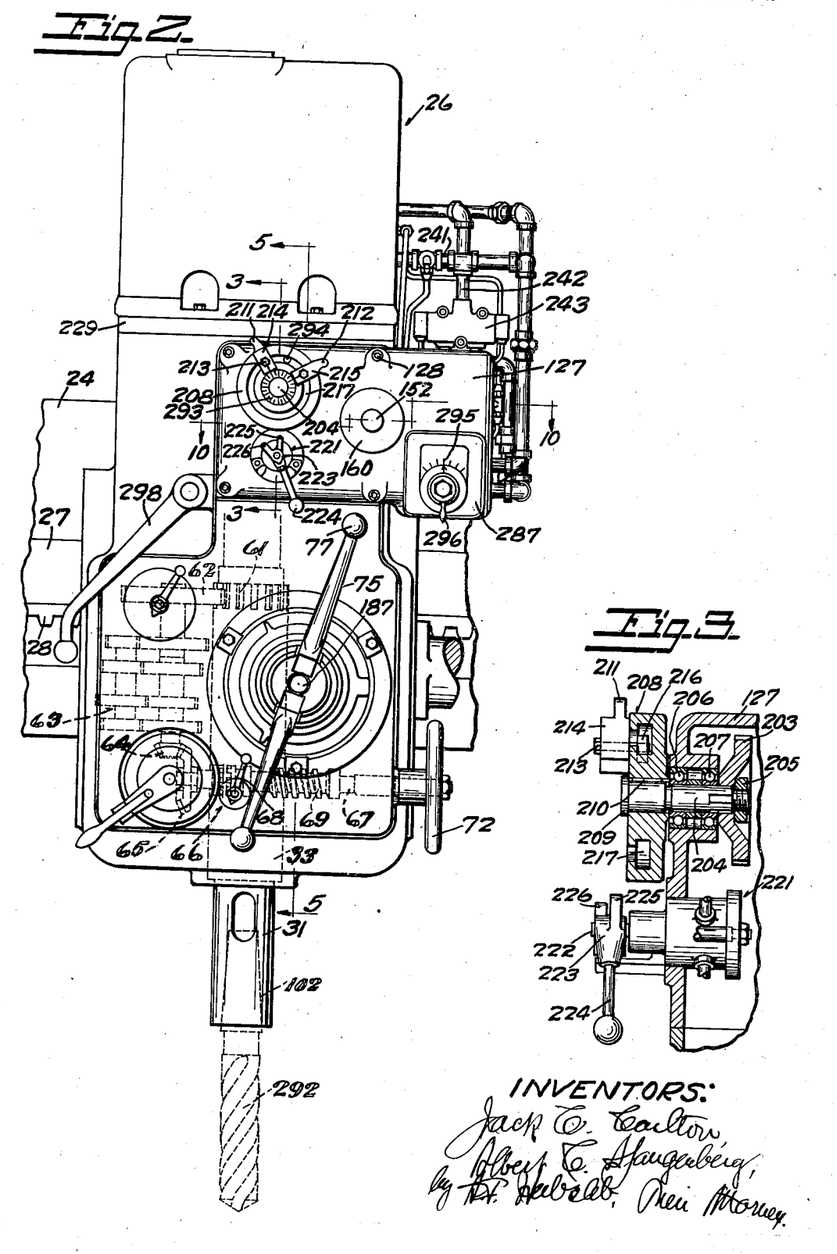
Fig. 2 is an enlarged front elevational view of the slide of the same, the arm being partly broken away, and with the cover for the fluid motor connections removed, a drilling tool being shown in dotted lines mounted in the spindle.
Fig. 3 is an axial section of a detail of the mounting of the reversing control means, taken on the line 3—3 of Fig. 2, and partly broken away.

The shaft 43 is rotated either manually or by power by being provided with a gear 51 fixed thereon and meshed by an intermediate gear 52 fixed on a shaft 53 rotatable in bearings 54 in the slide. The intermediate gear is meshed by a gear 55 carried by a head 56 rotatably held in bearings 57, 58 in the slide. The driving means for power translation of the spindle for drilling operations includes a pinion 61 on the spindle sleeve 33 meshed by a gear 62 rotatably mounted in the slide and in train with a speed change gear transmission 63 (Figs. 2, 4 and 5). The speed change gear transmission imparts rotation at desirable speeds to a pair of meshing bevel gears 64, 65. A usual clutch 66 connects the bevel gear 65 with a shaft 67 when it is desired to translate the spindle by power, the clutch being released when it is desired to translate the spindle manually by means of the shaft 67. The clutch is engaged or disengaged by a usual handle 68.

The shaft 67 has a usual worm 69 thereon which meshes with a worm wheel 70, the hub of which is journaled in a bearing 71 in the slide about the head 56. The shaft 67 is arranged to be rotated either by hand or by power, when it is desired to translate the tool spindle, by a hand wheel 72 on said shaft or by the power train, the worm wheel being normally prevented from rotation except through the medium of the worm.

Further means are provided for translating the spindle manually including usual diametrically related planetary levers 75 pivoted on pivots 76 on the head 56 and provided with manipulating handles 77. Rollers 78 are provided on the levers by being rotatably mounted on relatively short inner arms extending inwardly of the pivots 76. The rollers 78 coact with cam faces 79 on a clutch element 80 endwise movable on the head 56, the rollers being arranged to move said element inwardly from the position shown in Fig. 5, when the levers 75 are moved outwardly toward each other for clutch engagement of a clutch 81, between said element and the worm wheel 70. The inner element of this clutch is fixed to the worm wheel. The clutch element 80 includes a sleeve 82 fixed thereto and connected to the head 56 by means of a toothed spline connection 83 to rotate the head by means of the worm wheel when the clutch 81 is engaged. The clutch element is normally urged outwardly for clutch release by usual springs 84 (Fig. 9).

The levers 75 have usual gear segments 85 thereon meshing with rack teeth 86 on a trip rod 87 slidable in a bore in the head 56. A usual trip lever 88 is pivoted at 89 on the slide and is actuated by a lug 90 (Fig. 6) projecting horizontally from the inner face of the gear 55', and movable with the gear in drilling machines described in the aforesaid patent for drilling operations. Upon actuation of the trip lever by the lug 90, an adjustable bolt 91 (Fig. 5) secured to the upper end of the trip lever contacts the end of the rod 87 to move the same outwardly to disengage the clutch 81 at the limits of axial movements of the spindle. A spring 92 normally retracts the trip lever, the spring being located about the bolt 91 and in an inner socket of a sleeve 93 which is part of the head.

The lower end of the trip lever 88 is provided with a latch 94 pivoted thereon on a pivot pin 95 and formed with teeth 96, 97 engageable under certain conditions by the lug 90. A spring pressed detent 98 carried by the lever 88 cooperates with the latch 94 to releasably hold the latch in either of two angular positions relative to the lever 88 and the lug 90, by being received selectively in notches 99, 100 in the latch. Movement of the lower end of the trip lever 88 toward the gear 55' is adjustably limited by an adjustable stop 101, shown as a screw threaded in the slide, and having a conical end engageable by the end of the pivot pin 95.

When the spindle is moving downwardly in the upper portion of its range of translatory movement and when it is approaching substantially the middle point of said range, the position of the parts is as indicated in Fig. 6, in which the arrow $a$ represents the direction of rotation of the gear 55' and the direction of movement of the lug 90 during downward translation of the spindle. In this position the spring pressed detent 98 is located in the notch 99 and the tooth 96 is held out of range of the lug 90 while the tooth 97 is disposed so as to be contacted thereby. Upon further rotation of the gear 55' from the position shown in Fig. 6 the lug 90 moves past the latch 94, contacting the tooth 97 for rotating the latch to the position, in which the detent 98 is received in the notch 100.

The tooth 96 is now located adjacent to the gear 55' and when the gear has completed its second rotation in the direction of arrow $a$, corresponding to downward translation of the spindle through the lower half of its range, the lug 90 contacts the tooth 96 and by camming action thereon shifts the latch and the lower end of the trip lever on which it is located away from the gear 55' to cause the bolt 91 on said lever to engage the inner end of the trip rod 87 and move the same outwardly to disengage the power feed clutch 81.

Upon reverse or upward translation of the spindle and corresponding reverse rotation of the gear 55', which direction of rotation is represented by the arrow $b$ in Fig. 6, the latch 94 coacts with the lug 90 in reverse order so that upon the first rotation of the gear 55' the latch is angularly moved to the position in which the detent 98 enters the notch 99, and in which the tooth 97 is in range of the lug 90 on the gear 55'. At the completion of the second rotation of the gear 55' in the direction of the arrow $b$, the spindle will have reached its upper limit of translation, and the lug 90 again actuates the trip lever 86 for disconnecting the power feed by disengaging the feed clutch 81.

So much of the drilling machine only has thus far been described as is affected by or cooperates with the means employed in the present invention, and no attempt has been made to show or describe the various refinements in a machine of this character.

It is one of the objects of the present invention to adapt a drilling machine for honing operations. Considerably different duties are imposed on the spindle for honing operations than for drilling operations, and the means exemplified for enabling the spindle to perform such divergent duties will now be described, it being understood that changes may be made in the exemplification without departing from the invention within the scope of the appended claims.

The spindle is arranged to have the usual tools for drilling secured thereto, as by having the tapered ends thereof secured in a usual taper socket 102 in the lower end of the spindle. The spindle is also arranged for having devices and tools for honing secured thereto, as by providing the outer ends of the shanks thereof with similar tapering outer ends arranged to be secured in the usual tapered socket in the lower end of the spindle in similar manner. The machine illustrated is exemplified as having a honing tool secured to its spindle for performing a honing operation. The honing tool 111 may be of desirable character and of usual construction (Fig. 1). The honing tool exemplified comprises a head 112 from which a shank 113 projects, in which there may be usual universal joints 114, 115, respectively between the main portion of the shank and the plug end 116 thereof secured in the tapered socket 102, and between said main portion of the shank and the head. The head may be provided with the usual grinding or honing sticks 117 radially mounted, adjustable and yieldable in usual manner. The honing tool is exemplified as operating on a piece of work 118, shown as a cylinder block, to hone or polish or gridingly finish the interior walls of the cylinders 119 thereof. The work is suitably secured to the base 21 of the machine, the work being shown raised above the base to suitable extent so that at least one end of the honing tool is permited to pass therethrough.

In usual drilling operations the spindle is rotated at relatively fast speeds for cutting, and in honing operations the spindle is rotated relatively slowly for feeding, the spindle preferably in the first instance rotating in a higher range, and in the second instance in a lower range of speeds of rotation. In drilling operations the spindle is translated at relatively slow speeds for feeding, and in honing operations the spindle is translated at relatively high speeds for cutting, the speeds of translation of the spindle preferably in drilling operations being in a lower range and in honing operations in a higher range of translatory reciprocations.

As examples, it may be stated that in the machine exemplified, the means shown and described for spindle rotation for drilling are arranged to rotate the spindle in a range of from 10 to 1200 R. P. M., and that axial feeds are imparted to the spindle in a range to .004 to .125 inch per revolution of the spindle. The range of linear speeds of translation of the spindle in usual drilling operations is aproximately from .04 inch per minute to 60 inches per minute, and the speed of translation depends upon the speed of rotation of the spindle, the higher speds of translation being obtained at higher speeds of spindle rotation and vice versa.

In performing the usual honing operations it is necessary to lower the range of the speeds of rotations of the spindle and rotate the spindle comparatively substantially more slowly than in drilling operations, as the rotating duty of the spindle is transferred from a cutting duty in drilling operations to a rotary feeding duty in honing operations. Such a range of speeds for rotary feed in honing operations may be exemplifier as advisedly 10 to 60 R. P. M. in the present exemplification. It is necessary also in performing honing operations to substantially increase the speeds of reciprocations of the spindle for cutting strokes of the honing tool and to move the honing tool at relatively high translatory speeds while rotating the honing tool at relatively low speeds, and that such translations of the spindle for honing may take place at desirable speeds up to approximately 480 inches per minute in the present exemplification, and that such range of translatory reciprocations may be approximately in a range of from zero to 480 inches per minute, as an example. The lower speeds of the speed ranges for honing are employed for setting up the job, the actual work of honing being done during employment of the higher speeds of said ranges in honing, depending on the character of work. The values given of spindle rotations and translatory movements are stated as examples and not as limitations, and may be varied according to the conditions encountered.

In the present invention, further, reversals of spindle power translations for honing take place without the necessity of being incident to reversals in spindle rotation, the spindle continuing to rotate in the same direction for feeding during opposite reversals of translative cutting movements of the honing tool, whereas in drilling reversals in rotation of the spindle are accompanied by reversals of power translations of the spindle.

Independent power means are preferably employed for obtaining the translatory movements of the honing tool, and such translatory movements of the honing tool are preferably obtained independent of spindle rotations for the reasons that in honing operations the principal duty of the honing is performed by such translatory movements of the honing tool and the rotary movements of the honing tool are primarily to have the honing tool progressively attack various sectors of the cylindrical wall which is being honed, and may be designated a feed for the honing tool in contradistinction to the duty of the drilling tool in which the rotary movement performs the cutting, and the axial movement the feeding.

In the present exemplification the translatory movements of the spindle in the honing operations are obtained by a hydraulic motor 125, which is secured by bolts 126 to a casing 127, fastened by bolts 128 to the slide 26 (Figs. 1, 2, 4 and 10). The rotor shaft 129 of the motor is provided with a pinion 130 keyed to the shaft and held thereon by a set screw 131. The outer end of the pinion has a reduced journal end rotatably mounted in a bearing 132 in the casing. A gear 133 meshes with the pinion and is fixed by suitable key connection to a shaft 134 mounted in bearings 135, 136 in the casing. The gear 133 is held against endwise movement on the shaft between the bearing 136 and a split washer 137 received over a reduced portion of the shaft and seating against a shoulder 138 thereon.

A disengageable drive connection (Fig. 10) is provided between the shaft 134 and the feed pinion shaft 43 comprising a gear 139 fixed to the feed pinion shaft by suitable key connection, and arranged to be meshed by a shiftable pinion 140 slidably mounted on the shaft 134 and having spline connection 141 therewith. A pinion 142 is received on a reduced end portion 143 of the feed pinion shaft and is held thereon by a nut 144 threaded over the threaded end of said shaft. The shaft is seated against a lug 145 in the casing to limits its endwise movement. The nut 144 clamps the pinion 142, the gears 139 and 51, the inner raceway of the bearing 44 and a sleeve 146, about the feed pinion shaft, against a shoulder 147 on said shaft and holds said parts firmly together. The spindle and honing tool are also counterbalanced by the counterweight 48, which may be made sufficiently heavy for the purpose.

A pull rod 151 provided with a hand knob 152 is slidable in a bore 153 in the shaft 134. The inner end of the pull rod has an opening therein to receive a pin 154 extending perpendicularly to the axis of the shaft, through slots 155 in the shaft and into holes 156 in the hub of the pinion 140. Plugs 157 are threaded into enlarged threaded portions of the holes 156 to maintain the pin 154 in position. By moving the hand knob 152 inwardly the pinion 140 is shifted into mesh with the gear 139 for translating the spindle by the hydraulic motor 125, as during honing, and by moving the hand knob outwardly the pinion is placed in idle position out of mesh with said gear 139 for disconnecting the hydraulic motor drive and allowing the spindle to be translated manually or by the usual power feeding means, as during drilling and other usual operations.

The pinion 140 is releasably located in meshed and in unmeshed positions by means of a spring pressed detent ball 158 received in annular grooves 159 in the pull rod 151, the ball and its spring being located in a hole in a cover plate 160 about the pull rod.

The spindle is reciprocated at relatively high speeds during honing, and it is advisable to disconnect the planetary levers 75 from rotative connection with the pinion 42 when employing the independent translating drive during honing operations, and to prevent the inconvenience and danger incident to idle high speed planetary movements of the planetary levers. Such disconnecting means are exemplified in the transmission train between the head 56 and the rack pinion shaft 43. For this purpose the gear 55' heretofore used is replaced by a divided gear 55 (Figs. 5 and 9), being divided into an outer tooth section 165 and an inner hub section 166, the hub of the latter being fixed to the head 56, as by a key 167, and the tooth section of the gear is arranged to rotate on the hub section, and is held in endwise relation therewith by being provided with an annular abutment face 168 coacting with a corresponding abutment face on the worm wheel 70 at one side of said tooth section, opposite axial movement of said tooth section being resisted by a flange 169 secured to the hub section by screws 170.

A clutch 175 comprises internal clutch teeth on the tooth section 165 and mating clutch teeth on the sleeve 82 on the clutch element 80. The clutch 175 connects said tooth section with the head 56 when such clutch is in engaged relation, for power and manual feed of the spindle in drilling operations, and when it is disconnected from said tooth section, the tooth section is allowed to rotate freely on the hub section, free of the head 56, when the spindle is translated at cutting speeds in honing operations.

To disengage the clutch 175, the clutch element 80 is caused to move outwardly from the position shown in Figs. 5 and 9. Such outward movement is accompanied by pivotal movements of the planetary levers 75 for moving the handles thereof inwardly into the inner dotted line position H shown in Fig. 5. It is advisable that such position of the handles be resistingly located to avoid thoughtless return of said handles to the full line positions in Fig. 5 by the operator.

During such inward movement of the planetary handles to inward position, the rollers 78 are moved out of obstructing relation with the cam faces 79 on the clutch element 80, and the clutch element 80 is moved outwardly by means of springs 84 surrounding stems 176 (Fig. 9), which pass through such clutch element and are threaded into the hub section 166.

By disconnecting the tooth section 165 from the head 56, the manual translating means for the spindle, as well as the power translating means therefor during drilling operations, are disengaged from the spindle, and the spindle is free to be moved endwise without effect upon or interference from either of said means. The gear 51 on the feed pinion shaft, the intermediate gear 52 in mesh therewith, and the outer tooth section 165 of the gear 55, continue in train with the feed pinion and have a fly wheel effect on the spindle movement when the spindle is reciprocated in the honing operations, serving to smooth and enhance steady operation.

It is desirable to prevent disengagement of the clutch 175 when the machine is being used for other than honing operations, and means are therefore provided which act on the planetary levers 75, to restrict them normally in drilling operations to positions for power feed, as exemplified by the outer dotted line position P of said levers in Fig. 5, and for manual feed, exemplified by the full line position M of said handles in said figure.

These means are exemplified as a stop 178 for the trip rod 87 (Figs. 5, 8 and 9) to limit outward movement of said rod by action of the springs 84 to the position shown in Fig. 5, in which the clutch 81 is disengaged, and the clutch 175 is engaged. The stop is shown as a stem movable endwise and rotatable in a bore 179 of a tubular extension 180 on the front plate 181 of the head 56. It is guided in a bearing 182 in a plug 183 threaded in the outer end of the bore 179 and in an inner bearing 184. The stem is resiliently urged outwardly by a spring 185 thereabout between a shoulder in the enlarged bore and a flange 186 of the stem. The outer end of the stem is provided with a knob 187 for manipulating the same.

The stem is contacted at its inner end by the trip rod 87 and normally limits outward movement of said rod, and is releasably held in inward position by means of wings 188 thereon, normally seating against the front plate of the head in locating notches 189. The stem is movable outwardly by rotating its knob 187 counter-clockwise so that its wings 188 are at right angles to their normal position shown in Fig. 8, so as to enter grooves 190 in the front plate, the spring 185 moving the stem to outward position, permitting the trip rod 87 to move outwardly, being urged in outward direction by the springs 84 which swing the planetary levers 75 about their pivots to move their handles 77 toward the slide into the position H, and thereby insuring disengagement in the clutches 81 and 175 to release the planetary levers when honing. Locating pins 191 in the inner face of the front plate are contacted by the wings 188 by rotation of the knob 187 clockwise to place the wings in registry with the notches 189 so as to enter said notches when resuming drilling.

For facilitating such latter movement the clutch element 80 is moved inwardly to engage the clutch 175 by moving the planetary handles 77 outwardly to the full line position M in Fig. 5, which movement causes inward movement of the trip rod by the segment gear and rack connections 85, 86, between the inner ends of the planetary levers 75 and said trip rod, to move the outer end of said trip rod inwardly away from the stem 178 to permit easy manipulation of said stem.

It is advisable to increase the range of translatory movements of the spindle of the drilling machine for performing honing operations owing to the fact that a greater part of the length of the honing tool is performing cutting than in the case of a drilling tool. The limits of translatory movement of the spindle correspond to the limits of movement of the lug 90, throughout its cycle of actuation of the latch 94 and its stoppage by said latch on the trip lever, since the lug 90 may not pass the trip lever after it has actuated the lever, as hereinbefore described. It is, however, desirable to provide in a machine that is to be used for honing, means for obtaining a greater length of translatory movement of the spindle than is usually provided in a drilling machine.

For this purpose I provide a lost motion connection between the lug 90 and the tooth section 165 of the gear 55 so that the length of spindle translation permitted in either direction is increased by the amount of such lost motion (Figs. 5, 6 and 7). Thus the lug 90 is suitably fastened to a ring 195 slidably received in an annular recess 196 in the inner face of the tooth section and held therein by the flange 169 which overlaps the inner circumferential edge of the ring 195. A key 197 is secured in a keyway in the outer edge of the sliding ring 195 and projects radially therefrom. The key is arranged to co-act with opposite end stop faces 198, 199 of a sector 200 located in the recess 196 and fastened by screws to the tooth section 165.

When the spindle is translated in either direction the tooth section rotates in corresponding direction and carries the sliding ring 195 with it until the lug 90 comes into stopping engagement with the latch 94 on the trip lever 88, whereupon the said ring is held stationary. The tooth section continues to rotate until one end of the sector 200 contacts the key 197, whereupon the ring again rotates with the tooth section momentarily for actuation of the trip lever 88. Upon reversal of translatory movement of the spindle and corresponding reversal of rotation of the tooth section and sliding ring, the lost motion connection between the lug 90 and the tooth section is again effective to permit an increase in the length of spindle translation corresponding to the amount of such lost motion, which is sufficient to allow for maximum reciprocation of the spindle during honing.

Automatic means are provided in the present invention to impart reciprocatory translatory movements to the spindle for cutting strokes of the honing tool, and comprise direction control means for the hydraulic motor 125 operative to reverse the motor at the end of each stroke of the spindle. Means are also provided whereby the length of stroke of such reciprocatory movement may be varied to meet the requirements of the work.

The pinion 142 on the feed pinion shaft 43 (Figs. 3, 5 and 10), is in mesh with a gear 203 fixed by suitable key connection to one end of a shaft 204, and held thereon by a nut 205. The shaft is journaled in bearings 206, 207 in the front wall of the casing 127, and extends to the outside of the casing, where it is provided with a trip wheel 208 held endwise by a flange 209 on the shaft and fixed to rotate with the shaft by a key 210.

Trip dogs 211, 212 are fastened to the wheel 208 in adjustable positions by bolts 213 passing through the bases 214, 215 of said dogs and threaded into nuts 216 slidable in an annular T slot 217 in said wheel. The trip dogs are off-set axially with relation to each other so as to move in spaced parallel planes.

A direction control device for the hydraulic motor 125 is shown as a pilot valve 221 having suitable control connection with said motor (Figs. 2, 3, 5, 11 and 12). The pivot valve is of ordinary construction and is provided with a usual oscillatable operating stem 222, to which is fixed a hub 223 of an operating handle 224. The hub is provided with axially offset tappets 225, 226, in line respectively with the dogs 211, 212 and arranged to be contacted thereby. The trip wheel 208 is rotated in consonance with the axial movement of the spindle by its connection with the feed pinion shaft, and the position of the dogs 211, 212 controls the moment of actuation of the pilot valve and therefore the length of reciprocatory movement of the spindle.

Figure 10:
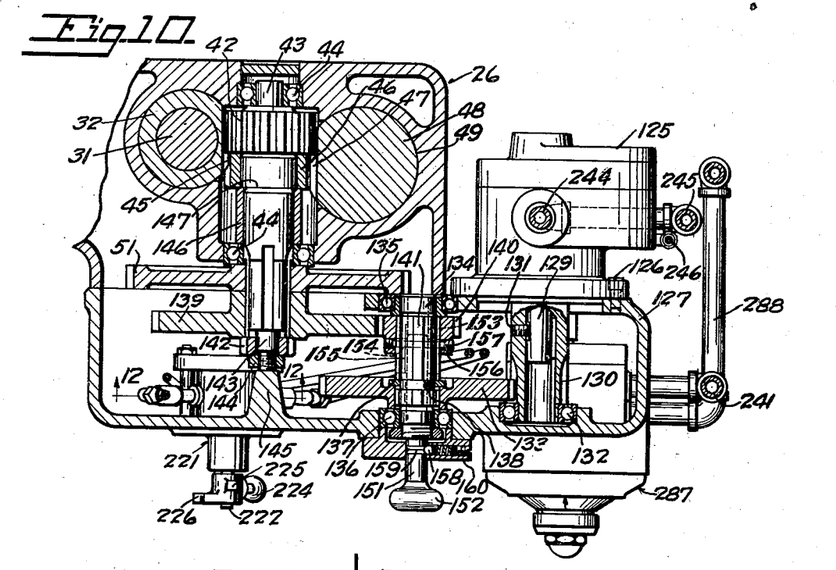
Fig. 10 is a horizontal sectional view of a portion of the spindle reciprocating train, taken on the irregular line 10—10 of Fig. 2, and partly broken away.

The hydraulic motor 125 is of ordinary well known construction and is arranged to be driven by suitable liquid, such as oil, supplied thereto under pressure (Figs. 4 and 10). A reservoir 227 for the liquid is provided comprising a casing 228, secured by its extension 229 to the slide at the front thereof and by a supporting leg 230, fastened to the casing and to the slide, at the rear thereof. It is located at the top of the slide, spanning the drill arm 24 therebelow. The reservoir is substantially totally enclosed. If it provided with a breather pipe 231 and an oil-level sight window 232.

Figures 11, 12, 13:
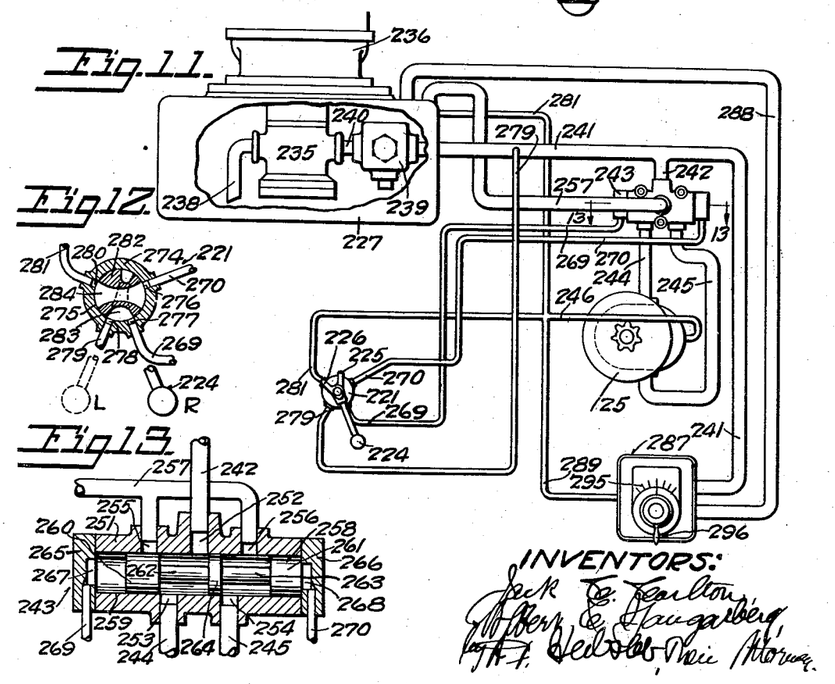

A hydraulic pump 235 of usual construction and preferably having constant speed is located in the reservoir casing by being suitably suspended from the frame of an electric motor 236, which is fastened to the top wall of the casing by bolts 237 (Figs. 4 and 11). The pump is directly driven by said electric motor. An intake pipe 238 is connected to the inlet port of the pump 235 and extends downwardly to a point adjacent to the bottom of the reservoir casing. A pressure relief valve 239 of usual construction, located within the reservoir casing, is connected to the outlet port of the pump by a pipe 240. A fluid pressure supply conduit 241 extends from the relief valve and connects with a conduit 242 connected to a reversing motor control valve 243, shown as a pilot operated valve, which may be of usual construction. The reversing motor control valve controls the direction of flow of the pressure fluid through the hydraulic motor 125 to which it is connected by conduits 244, 245. A usual drain conduit 246 connects the hydraulic motor with the return conduit 281 leading to the reservoir 227.

The motor direction control valve 243 (Figs. 2, 4, 11 and 13), comprises a substantially cylindrical body 251 provided intermediate its ends with a pressure fluid intake port 252 to which the conduit 242 from the pump is connected. At its opposite side the body has ports 253, 254 formed therein which are offset with relation to the port 252 and are connected with the conduits 244, 245 respectively. Fluid return ports 255, 256 are also provided in the valve body and are connected with one end of a return conduit 257, the other end of which is connected to the reservoir for discharging thereinto.

A valve piston assembly 258 is closely fitted for reciprocation in a bore 259 and is provided with pistons 260, 261 joined by stems 262, 263 to an intermediate piston 264. The piston assembly is so arranged that when at one end of its movement, for example as shown in Fig. 13, the intake port 252 is in communication with the port 253 to rotate the hydraulic motor in one direction, the return port 255 to the reservoir is closed by the piston 260. Return flow from the fluid motor passes through the conduit 245, the port 254, the port 256 and through the conduit 257 back to the reservoir. When the piston assembly is at the opposite end of its movement, the return port 256 is blocked by the piston 261, the intake port 252 is in communication with the port 254 to the motor, to rotate the hydraulic motor in opposite direction, and the port 253 is in communication with the return port 255, for discharge of the liquid from the idle side of the motor to the reservoir.

Means for moving the piston assembly and thereby reversing rotation of the fluid motor are shown as remotely controlled fluid operating means having operative connection with the pilot valve. The ends of the bore 259 are closed by caps 265, 266 in which ports 267, 268 are provided in communication with the interior of the valve body (Fig. 13). Fluid introduced through the port 267 or the port 268 causes shifting of the piston assembly to either extreme position for reversing the fluid motor 125. The ports 267, 268 are respectively connected by conduits 269, 270 with the appropriate ports of the pilot valve 221.

The body 274 of the pilot valve 221 (Fig. 12) is provided with a bore 275 with which ports 276, 277 communicate. The port 276 is connected with the conduit 270, and the port 277 is connected with the conduit 269. These ports are arranged to be connected with the pressure liquid supply to shift the valve piston of the reversing motor control valve 243, by a pressure fluid inlet port 278 in the pilot valve body, which is in communication with the pressure supply conduit 241 by means of a conduit 279, and a return port 280 is connected by a conduit 281 with the reservoir.

A valve plug 282 rotatably received in the bore 275 of the pilot valve body is provided with passages 283, 284 extending across said plug and separated from each other. In the angular position of the valve plug represented in Fig. 12, one end of the passage 283 extends across the ports 277, 278 and permits flow of pressure fluid through the conduit 269 to the port 267 at one end of the motor control valve 243, the opposite end of the passage 283 being closed by the wall of the bore 275. At the same time the passage 284 connects the port 276 with the return port 280 so that fluid may flow in return direction from the port 268 at the other end of the reversing motor control valve to the reservoir. With this position of the valve plug 282, the handle 224 is in the full line position R in Fig. 12.

When the valve plug is rotated clockwise substantially forty-five degrees from the full line position shown in Fig. 12 to the position represented by the dotted line position L of the handle 224, the passage 283 connects the inlet port 278 with the port 276 to direct the pressure fluid through the pipe 270 to the port 268 of the control valve 243 to move the piston assembly 258 to the opposite end of the bore 259, shown in Fig. 13, and thereby reverse the fluid motor 125. The passage 284 now connects the port 277 of the pilot valve with the port 280 to permit return flow of fluid from the port 267 of the motor control valve.

A usual control valve 287 is provided between the supply conduit 241 and a return conduit 288 to the reservoir to vary the speed of reciprocatory movement of the spindle 31. This is a feed or pressure control valve.

A usual drain conduit 289 connects the feed control valve with the return conduit 281 leading to the reservoir. The feed control valve, which may be of any well known construction, is preferably an adjustable metering device acting as a by-pass for the fluid motor, to control, by its setting, the pressure in the supply pipe to the fluid motor to control the speed of said motor and preferably acts independently of the pressure in the system. It is manually set. The feed control valve is arranged to be set in fully opened position to cause complete stoppage of the fluid motor 125, or in fully closed position for the highest possible speed of said motor, or in any intermediate position.

It will be apparent from the above description that the spindle will be automatically reciprocated by the fluid motor 125 at a speed depending on the setting of the feed control valve 287 and within limits of reciprocatory movement corresponding to the positions of the pilot valve actuating dogs 211, 212 on the wheel 208. Also the handle 224 of the pilot valve may be manipulated to manually control the direction of rotation of the fluid motor 125 at certain times, as when setting up the machine for a piece of work, and, when desired, may be manually placed and held in an intermediate or neutral position, to stop rotation of the fluid motor.

A hood 290 is provided to cover the motor, the motor control valve and the conduits therefor, and is fastened to the slide 26 by brackets 291 secured to the slide and to the hood, as shown in Fig. 1.

Only the essential means of the hydraulic mechanism have been shown and described, and greater refinements may be introduced if desired.

Summarizing the operation, the spindle 31 is rotated by means of an electric motor 35 through usual clutch and reversing gearing 37, 38 movable with the usual slide 26 and operated by the usual cross-shaft 36, extending lengthwise of the drill arm, and usual speed changing gearing 39 mounted on the slide. The spindle is translated by said motor at selective speeds through speed change gearing 63, having power drive connection with the spindle sleeve 33 through the pinion 61 on the latter, and arranged to rotate the worm 69 in mesh with the worm wheel 70, surrounding and arranged to be clutched to the head 56 by means of the releasable clutch 81 and the releasable clutch 175, the latter being clutched and unclutched in the train of gearing which rotates the feed pinion 42 for spindle translations in drilling operations, as when employing a drilling tool 292.

In performing honing operations the clutches 81, 175 are released, and means independent of the feeding means for drilling are provided for translating the spindle to produce the cutting functions of the honing tool secured to and reciprocable with the spindle.

These independent translating means for the spindle are exemplified as the hydraulic pump 235, which is preferably of the vane type, the hydraulic motor 125, which is preferably of the gear type, and the direction control valve 243 between the same, for reversing the rotation of the motor while the direction of rotation of the pump remains constant. The direction control valve for the motor is controlled by the pilot valve 221, which is operated by power through tappet mechanism having operative connection with one of the elements in the train of translating mechanism of the spindle, exemplified as the feed pinion 42 of the drilling machine, which reverses the pilot valve at the ends of axial movements of the spindle, the pilot valve being also manually operated by the handle 224, for stopping the reciprocations of the spindle, and for manually controlling said reciprocations, as when setting up work, or for applying local reciprocations to the honing tool, as when it is desired to hone certain portions of the work more than others, for the reason that certain parts of the metal in the surface being honed are harder than others, or for other reasons.

The trip wheel 208, carrying the dogs 211, 212, for operating the pilot valve, is provided with a suitable scale 293, according to which the dogs 211, 212 are set angularly with relation to each other, and to the central stop shown as a pin 294 between the same on the wheel. The feed control valve 287 is provided with a suitable scale 295, according to which the handle 296 thereon is moved from the position zero, to indicate full opening of said valve, through a range of scale markings indicating various speeds of reciprocatory translations of the honing tool, to the maximum of such speeds, at which said valve is entirely closed.

The planetary levers 75 are arranged to be placed in the outer dotted position P to engage the clutch 81 for power feed during drilling, and into the full line position M for manual feed during drilling, in each of which positions the clutch 175 is engaged. For honing, the planetary levers 75 are placed in the inner dotted line position H. This disengages the clutch 175 and permits the planetary levers 75 to remain rotatively at rest, and interrupts the drilling feed train.

The honing translatory train has operative connection with the feed pinion shaft 43. When the clutch 175 is disconnected, the tooth section 165 of the two-part gear 55, the gear 52 and the gear 51 still have operative connection with the feed pinion shaft 43 and have a fly wheel effect upon the feed pinion shaft for smoothing the movements and reversals of the feed pinion shaft during reciprocatory cutting movements of the spindle when honing.

The locking means provided for locking the clutch 175 in engaged relation for insuring operative connections in the feeding train for drilling, and for moving said clutch into disengaged relation for honing translations, are operated by the handle or knob 187 and insure non-interference between said operations. The face of the outer end of this handle or knob is provided with the lettering "When honing turn to right and pull out" in connection with an arrow indicating rotation clockwise. The effect of this rotation is to cause the wings 188 to leave the pins 191 (Fig. 8) and enter the grooves 190 for moving the stem 178 outwardly, which is also urged thereto by the spring 185, whereby the trip rod 87 is moved outwardly in the head by the springs 84, and whereby, by reason of the rack and segment gear connection with the planetary levers 75, the outer ends of said levers are moved rearwardly toward the slide into the dotted line position H in Fig. 5, indicating "honing". When it is desired to resume drilling, the outer ends of these levers are moved outwardly, thereby moving the trip rod 87 inwardly and permitting ease of inward pushing of the handle or knob 187 and turning of the same counter-clockwise until its wings 188 engage the pins 191 and enter the locating notches 189 for locking the same in drilling position.

Supplemental to the handle or knob 187, the handle or knob 152 is operated for connecting the pinion 140 on the shaft 134 with the gear 139 when the honing train is to be put in operation. The front face of the handle or knob 152 has thereon the instruction "Push knob in when honing".

Means, instancing the slip ring 195 the lug 90 thereon, the contact key 197 and the arcuate piece 200, enlarge the range of translation of the spindle for drilling operations in order to accommodate the greater lengths of translations desired for honing operations.

In honing, the column 23 with the radial arm 24 thereon is adjustable to various angular positions about the axis of the upright post 22 selectively completely around the post, and the arm is adjustable to desired elevation above the base, which may also extend completely about the post as indicated by the dotted extension 21' thereof, partly broken away, the column and arm being clamped in adjusted positions by the handles 297 and 25 respectively, and the slide and the honing spindle and honing tool thereon are adjustable along the arm toward and from the column, and clamped in adjusted positions by a slide clamp operated by the handle 298, so as to locate the spindle and the honing tool in line with the bore of a work-piece to be honed, making it unnecessary to locate the work-piece, which is usually heavy and unwieldy, with exactness on the base, providing convenient, ready and easily operated means to aline the honing tool with the work. The work-piece is so located and secured to the base that the honing tool in its translatory reciprocations will protrude from the work-piece at both ends of its translatory reciprocations to insure truly cylindrical honing of the bore.

The work-piece may further be clamped to the base and both drilling operations and honing operations performed thereon without changing the clamped position of the work-piece, and the same holes may be first drilled and then honed by employment of suitable drilling tools and honing tools, which may be of any character desired, without changing the position of the work-piece, by the changes in transmission connections hereinbefore described for changing from drilling to honing, and vice versa, providing speedy, economical and convenient performance of the work desired.

It is, of course, obvious that changes in construction of the mechanism it has been preferred to show and describe herein, the relations therebetween, and in the details thereof, may be made without departing from the invention herein within the scope of the appended claims.

We claim:

1. A drilling and honing machine including mechanical power trains for rotating and translating the tool spindle and hydraulically operated reciprocating means to reciprocatingly translate the tool spindle, and selector means to selectively operatively connect the mechanical power train for translating and the hydraulically operated means for reciprocatingly translating, with the tool spindle, for so translating the tool spindle.

2. A drilling and honing machine including a tool spindle translating part, a mechanical power train for rotating the tool spindle, and a mechanical power train and hydraulic reciprocating means respectively for translating and for reciprocating said spindle translating part, and selector means to selectively operatively connect said second-named mechanical power train and said hydraulic reciprocating means with said spindle translating part for respectively translating and reciprocating the spindle.

3. A drilling and honing machine including spindle rotating means, a spindle translating part, a feed pinion for translating the same, a mechanical power train and hydraulic means respectively for rotating said feed pinion respectively at lower speeds for feeding in drilling and at higher speeds for cutting in honing, disconnecting means in said mechanical power train, and disconnecting means in said hydraulic means, said disconnecting means selectively operable to selectively connect and disconnect said mechanical power train and said hydraulic means with relation to said feed pinion to selectively translate said spindle translating part by means of said mechanical power train and said hydraulic means.

4. In a drilling and honing machine, the combination of spindle rotating means, a spindle translating part, a mechanical power transmission train to translate said spindle translating part comparatively slowly for feeding in drilling, a hydraulically operated transmission train including reciprocating means to translatingly reciprocate said spindle translating part comparatively rapidly for cutting in honing, and interrupting means in said respective trains to selectively control the power transmissions to said spindle translating part.

5. In a drilling and honing machine, the combination of spindle rotating means, a spindle translating part, a feeding head, a feeding train between said head and said spindle translating part, a planetary lever pivoted to said head, power means to rotate said head, a clutch between the latter and said head, a clutch between said head and said feeding train, said planetary lever having operative connections with members of said respective clutches for disengaging said clutches in sequence for release of said head from said power means during maintainance of connection in said second-named clutch for manual operation of said feeding train by means of said planetary lever, and for release of said second-named clutch for release of said feeding train from said head, power reciprocating means, and releasable transmission connection between the latter and said spindle translating part whereby to translatingly reciprocate said spindle translating part for honing during release of said clutches.

6. In a drilling and honing machine, the combination of spindle rotating means, a spindle translating part, a feeding head, a feeding train between said head and said spindle translating part to feed said spindle translating part during drilling, a planetary lever pivoted to said head wherewith to manually rotate said head, power means to rotate said head, a clutch between the latter and said head, a clutch between said head and said feeding train, said planetary lever having operative connections with members of said respective clutches whereby to operate said first-named clutch during maintenance of clutched relation in said second-named clutch to selectively transmit power feed and manual feed to said feeding train and whereby to release both said clutches for release in said feeding train, power reciprocating means, and releasable transmission connection between the latter and said spindle translating part to reciprocate said spindle translating part for honing.

7. In a drilling and honing machine, the combination of spindle rotating means, a spindle translating part, a feeding head, power means and manual means for rotating said feeding head, a feeding train between said head and said spindle translating part, releasing means between said head and said feeding train to maintain a portion of said feeding train in operative connection with said spindle translating part, additional power means, and releasable operative connection between the latter and said spindle translating part, said portion of said feeding train so maintained in operative connection with said spindle translating part rotated by said additional power means with fly-wheel action on said spindle translating part.

8. In a drilling and honing machine, the combination of spindle rotating means, a spindle translating part, a feeding head, power means and manual means for rotating said feeding head, a feeding train between said head and said spindle translating part, power reciprocating means, a transmitting train between the latter and said spindle translating part, and releasing means for each of said trains constructed to maintain a portion of each of said trains in operative connection with said spindle translating means to form fly-wheel means for said spindle translating part.

9. In a drilling and honing machine, the combination of spindle rotating means, a spindle translating part, a plurality of power trains and manual operating means to translating said spindle translating part, releasable power transmitting means for the respective ones of said plurality of power trains, and releasable transmitting means for said manual operating means, said last-named releasable transmitting means operative for manual transmission between releases of all said releasable power transmitting means, related respectively for manual feed of said spindle translating part in drilling operations and for power feed and power translation of said spindle translating part respectively in drilling and in honing operations.

10. In a drilling and honing machine, the combination of a spindle translating part, a feeding head, manual means and power means respectively for rotating said head including releasable transmitting means respectively for said manual means and said power means, constructed whereby said transmitting means for said manual means, is in transmitting relation during transmitting and release relations in said transmitting means for said power means and said manual transmitting means arranged to be placed in release relation for release of operative connection between said head and said spindle translating part, and power reciprocating means for translatingly reciprocating said spindle translating part during release relations in said releasable transmitting means.

11. In a drilling and honing machine, the combination of a spindle translating part, a rotatable feeding head in train with said spindle translating part, a planetary lever on said head to rotate said head manually, power means to rotate said head, releasable transmitting means between said power means and said head, releasable transmitting means between said head and said spindle translating part, operative connecting means between said planetary lever and first-named releasable transmitting means to engage and release the same during maintenance of engagement in said second-named releasable transmitting means, operative connecting means between said planetary lever and said second-named releasable transmitting means to release said second-named releasable transmitting means during release relation in said first-named releasable transmitting means, and power reciprocating means to reciprocate said spindle translating part during such release relation in said second-named releasable transmitting part.

12. In a drilling and honing machine, the combination of a spindle translating part, a feeding head, a transmitting train between said head and said spindle translating part, power means to rotate said head, power reciprocating means, a clutch between said first-named power means and said head, a clutch between said head and said transmitting train, and a planetary lever on said head, said planetary lever having operative connections with said clutches to operate the same in sequence in both directions for release in said first-named clutch, maintenance of connection in said second-named clutch and release in of said second-named clutch, the latter for operative connection of said power reciprocating means with said spindle translating part, and vice versa.

13. In a drilling and honing machine, the combination of a spindle translating part, a feeding head, a planetary lever thereon for manual rotation of said head, a transmitting train between said head and said spindle translating part including a releasable transmitting connection, power means to rotate said head, a releasable transmitting connection between said power means and said head, said planetary lever having operative connections with said releasable transmitting connections to engage and release said second-named transmitting connection during maintenance of engagement in said first-named transmitting connection, a releasable stop to maintain said planetary lever in such relation, said stop being releasable for movement of said planetary lever to release said first-named transmitting connection, and power reciprocating means to translatingly reciprocate said spindle translating part during release relation in said first-named transmitting connection.

14. In a drilling and honing machine, the combination of a spindle translating part, a plurality of power trains one of which includes reciprocating means respectively for translating and for reciprocating said spindle translating part, one of said trains including a feeding head, a pluripart gear, and a releasable drive connection, a slip ring slidable about the axis of said pluripart gear on one of the parts thereof, a striker key and a lug thereon, an actuating part rotatable with said one of said parts to engage said striker key and normally spaced therefrom, and an actuating latch for said releasable drive connection with which said lug engages to release said releasable drive connection.

15. In a drilling and honing machine, the combination of a spindle arranged for selectively supporting a drilling tool and a honing tool, means for rotating the spindle, and power means and connections therefor for axially translating the spindle selectively at low drilling speeds and at high honing speeds higher than permissible for drilling, said connections including automatic reciprocating means whereby said translations of the spindle at high honing speeds are produced as automatic reciprocations of the spindle.

16. In a drilling and honing machine, the combination of a spindle, means for rotating the spindle, alternative power means for axially translating the spindle selectively at low drilling speeds and at high honing speeds higher than permissible for drilling, one of said alternate power means including automatic reciprocating means whereby said translations of the spindle at high honing speeds are produced as automatic reciprocations of the spindle, and selector means to connect said alternative power means selectively with the spindle respectively for drilling operations and for honing operations.

17. In a drilling and honing machine, the combination of a spindle, means for rotating the spindle, alternative power means for axially translating the spindle selectively at low drilling speeds and at high honing speeds higher than permissible for drilling, one of said alternate power means including automatic reciprocating means whereby said translations of the spindle at high honing speeds are produced as automatic reciprocations of the spindle, and selector means to connect said alternative power means selectively with the spindle respectively for drilling operations and for honing operations, and said automatic reciprocating means including manual means for axially reciprocating the spindle at selective speeds for honing operations.

18. In a drilling and honing machine, the combination of a spindle, a feed pinion therefor, hydraulic means including reciprocating means for rotatively reciprocating said pinion for honing reciprocations of the spindle, manual means to control said reciprocations, power means for rotating said feed pinion for drilling feed of the spindle, a manual means for rotating said feed pinion for manual feed of the spindle, and means for selectively operatively connecting said hydraulic means, said power means and said last-named manual means with said feed pinion.

19. In a drilling and honing machine, the combination of an axially translatable spindle arranged for selectively supporting a drilling tool and a honing tool respectively for drilling movements and for honing movements of the spindle, head mechanism including a rotatable head and planetarily movable arms pivoted to said head and arranged to be placed in a plurality of angular positions transverse to the axis of rotation of said head, operative connections therefor respectively for power feed, for manual feed and for release of feed of the spindle in drilling, controlled by the angular positions of said arms, and power reciprocating means having operative connection with the spindle for reciprocating the same for honing movements, and means for disconnecting the latter.

20. In a drilling and honing machine, the combination of a spindle translating part, a feeding head comprising a power driven rotatable member, a manually driven rotatable member, and a transmitting member for said spindle translating part having coincident axes, a clutch between said first two named members, a clutch between said second and third named members, a planetary handle pivoted to said second-named rotatable member arranged to be shifted into a plurality of planes transverse to said axes and connections therefor to operate said first-named clutch during maintenance of operative connection in said second-named clutch, and to operate said second-named clutch to transmittingly engage and disengage said transmitting member with relation to said rotatable members, and automatic reciprocating means for said spindle translating part.

21. The combination of a spindle for supporting a honing tool, power means to rotate said spindle at comparatively slow speeds for rotatively feeding the honing tool, a rack sleeve about said spindle, a pinion meshing with the rack on said sleeve, and a rotary hydraulic motor including automatic rotary reciprocating means for said pinion to impart automatic translating cutting reciprocations at comparatively high speeds to the honing tool.

22. In a drilling and honing machine, the combination of a rotatable and translatable tool spindle, power means for rotating the spindle, translating means connected with the spindle for translating the same, a driving connection between said power means and said translating means to translate said spindle in consonance with spindle rotation for drilling, a second power means, and driving connection between said second power means and said translating means including automatic reciprocating means to automatically reciprocate said spindle independently of spindle rotation for honing.

23. In a drilling and honing machine, the combination of a rotatable and translatable spindle, power means for rotating the spindle, translating means connected with the spindle for translating the same, driving connection between said power means and said translating means to translate said spindle in consonance with spindle rotation for drilling, a second power means, driving connection between said second power means and said translating means including automatic reciprocating means to automatically reciprocatingly translate said spindle independently of spindle rotation for honing, and means for selecting said driving connections for spindle translation.

24. The combination of a power driven member, a manually rotatable head, a pluripart gear and a clutch sleeve having coincident axes, a clutch between said power driven member and said sleeve, a clutch between said sleeve and one of the parts of said pluri-part gear, a spindle translating part with which said pluri-part gear has operative connection, and means to axially shift said sleeve to clutch and unclutch said first-named clutch whilst said second-named clutch is maintained in clutched relation during a portion of the range of shifting movement of said sleeve and to unclutch said second-named clutch to release said spindle translating part during another portion of the range of shifting movement of said clutch.

25. The combination of a power driven member, a manually rotatable head, a pluripart gear and a clutch sleeve having coincident axes, a clutch between said power driven member and said sleeve, a clutch between said sleeve and one of the parts of said pluri-part gear, a spindle translating part with which said pluri-part gear has operative connection, means to axially shift said sleeve to clutch and unclutch said first-named clutch whilst said second-named clutch is maintained in clutched relation during a portion of the range of shifting movement of said sleeve and to unclutch said second-named clutch to release said spindle translating part during another portion of the range of shifting movement of said clutch, and releasable means to confine said last-named means within said first-named portion of said range of shifting movement.

JACK C. CARLTON.
ALBERT C. SPANGENBERG.